Patented Feb. 21, 1950

2,498,539

UNITED STATES PATENT OFFICE 2,498,539

METHOD OF CRYSTALLIZING UREA

Jean Leon Maurice Frejacques, Paris, France, assignor to Compagnie de Produits Chimiques et Electrometallurgiques Alais, Froges et Camargue, Paris, France, a corporation of France No Drawing. Application July 22, 1947, Serial No. 762,814. In France February 3, 1942

Section 1, Public Law 690, August 8, 1946
Patent expires February 3, 1962

5 Claims. (Cl. 260—555)

Urea normally crystallizes by cooling from its concentrated solutions in fine needles and is thus obtained in a rather unpractical form, presenting a fairly low apparent density, with all the disadvantages which that involves from the point of view of the driers and extractors, as well as the volume of the packages. Moreover, in this form, urea has a tendency to clog up in the sacks, it pours with difficulty from the silos and it does not pass conveniently into the distributors.

The present invention relates to a method of crystallizing urea in a different apparent form, which avoids all these disadvantages. This method consists in adding to the urea solutions to be crystallized, a small amount of a member of the group formed by cyanuric acid and its salts i. e. of a compound containing the cyanuric ion. When the solutions are not or are only feebly alkaline, very small quantities of cyanuric acid, of the order of 0.2 to 0.5% in relation to the weight of the solution to be crystallized, are sufficient to modify the appearance of the crystals obtained by cooling. The urea is then presented in a sandy form, much more advantageous from all points of view. The crystalline system is still the same as in the absence of cyanuric acid, as is shown by the X-ray diagrams; only the appearance of the crystals is changed.

Generally, the mother-liquors circulating in a crystallizing plant are more or less ammoniacal, or become so in the long run owing to hydrolysis of the urea. In this case, the quantities of cyanuric acid to be added are much higher and these quantities, without being prohibitive, are rather disadvantageous. By adding zinc cyanurate instead of cyanuric acid, the desired crystallization can still be obtained with the weak doses indicated above, even when the mother-liquors are strongly ammoniacal. It is possible, as is well known, to prepare zinc cyanurate at the moment of its use by simply adding cyanuric acid and zinc hydrate to the mother-liquors. But it is in general preferable to prepare it in advance, in the known manner, by precipitating a solution of alkaline cyanurate with zinc oxide dissolved in an excess of alkali, soda, potash or ammonia.

One of the most practical known processes for preparing cyanuric acid consists in heating urea to about 200° for some hours with anhydrous zinc chloride. The zinc compound desired is readily obtained from the molten mass resulting from this operation. For this purpose, this mass is poured in the molten state into water acidulated with hydrochloric acid, then the cyanuric acid which precipitates is separated by filtration from the hydrochloric solution of zinc chloride and is dissolved in ammonia. Ammonia is also added to a fraction of the filtrate—about the fifth part—until redissolution of the zinc hydrate formed. The solution of zincate of ammonia obtained is filtered in order to eliminate the oxides, ferric or other, generally present in zinc chloride, then it is added little by little to the preceding solution of cyanurate of ammonia until precipitation ceases. Lastly the precipitate formed is drained and washed until complete elimination of the chloride ions. In this way there is obtained a very clean zinc cyanurate, which is perfectly suitable for the purpose in view.

Example

An aqueous solution of urea, saturated at the ordinary temperature and containing 5 gr. of ammonia per kg., is heated to 50° C.; urea is dissolved therein until approaching saturation and there is added 0.5% by weight of zinc cyanurate. The solution is cooled to the ordinary temperature in a crystallizer, with agitation. The urea, which crystallizes in a sandy form in small cubes of ½ to a few millimetres in side dimension, is drained and then dried. The mother-liquors are reheated to 50° C. and saturated again with urea without adding fresh zinc cyanurate, and the operations begin again. From time to time, the quantity of zinc cyanurate remaining in the mother-liquors is tested by any known method and the quantity necessary to make up the concentration of 0.5% is added.

What I claim is:

1. In a method of crystallizing urea in a sandy form from an aqueous solution thereof, the step of adding to the aqueous urea solution to be crystallized a quantity ranging from 0.2 to 0.5% by weight of cyanuric acid.

2. In a method of crystallizing urea in a sandy form from an aqueous solution thereof, the step of adding to the aqueous urea solution to be crystallized a quantity ranging from 0.2 to 0.5% by weight of zinc cyanurate.

3. In a method of crystallizing urea in a sandy form from an aqueous solution thereof, the step of adding to the aqueous urea solution to be crystallized a small amount, in relation to the weight of the solution to be crystallized, of a member of the group consisting of cyanuric acid and its inorganic base salts.

4. In a method of crystallizing urea in a sandy form from an aqueous solution thereof, the step of adding to the aqueous urea solution to be crystallized at least 0.2% by weight of a member of the group consisting of cyanuric acid and its inorganic base salts.

5. In a method of crystallizing urea in a sandy form from an aqueous solution thereof, the step of adding to the aqueous urea solution to be crystallized a quantity ranging from 0.2 to 0.5% by weight of an inorganic base salt of cyanuric acid.

JEAN LEON MAURICE FREJACQUES.

REFERENCES CITED

The following references are of record in the file of this patent:

UNITED STATES PATENTS

| Number | Name | Date |
|---|---|---|
| 1,584,875 | Lidholm | May 18, 1926 |
| 1,908,715 | Miller | May 16, 1933 |
| 1,951,518 | Meiser | Mar. 20, 1934 |
| 2,297,034 | Strzyzewski et al. | Sept. 29, 1942 |

FOREIGN PATENTS

| Number | Country | Date |
|---|---|---|
| 448,395 | Belgium | January 1943 |
| 232,594 | Switzerland | Sept. 1, 1944 |